2,936,491
METHOD FOR INCREASING THE DIAMETER OF THERMOPLASTIC TUBING

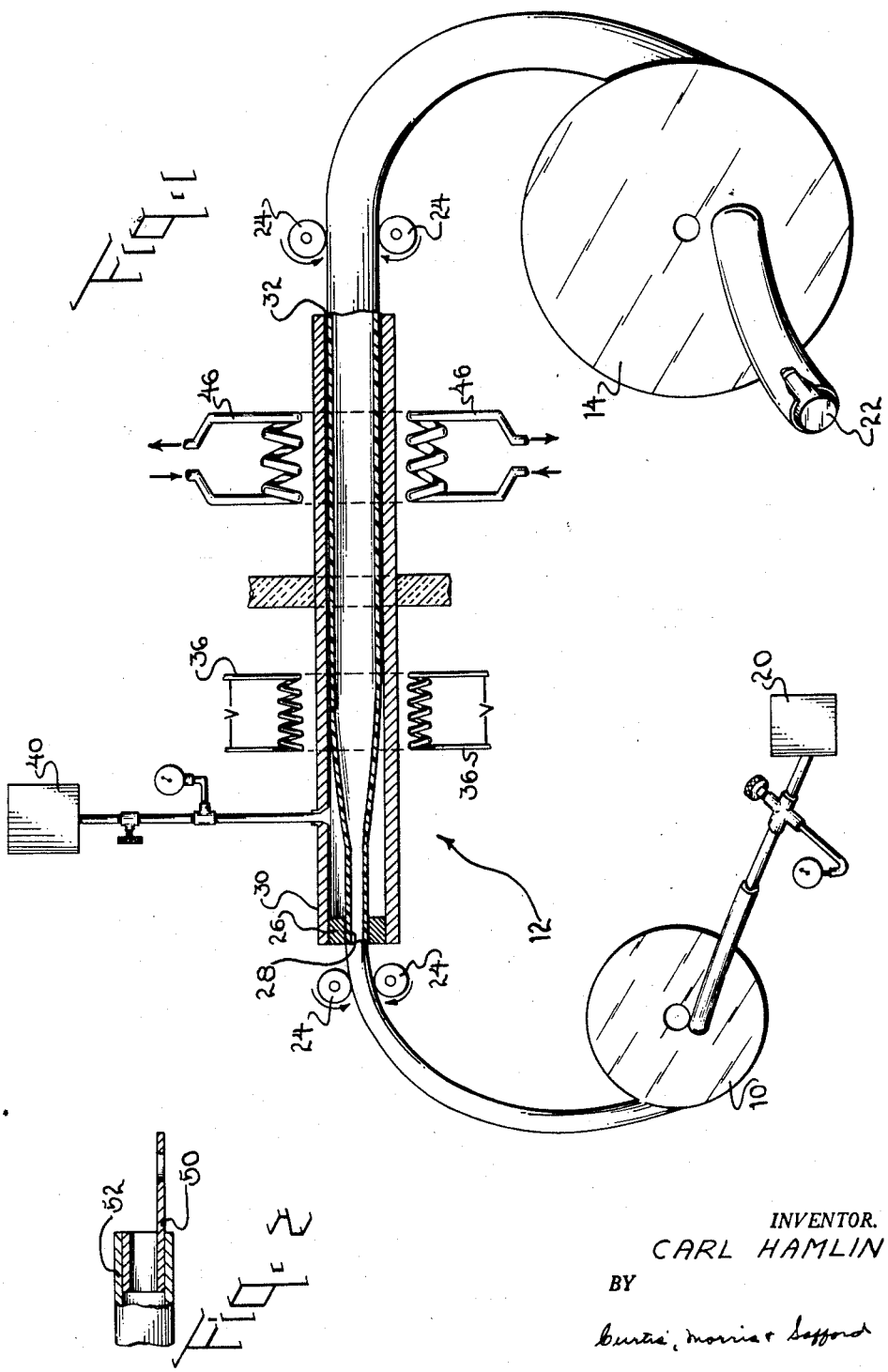

Carl B. Hamlin, Harrisburg, Pa., assignor to AMP Incorporated, Harrisburg, Pa.

Application December 19, 1956, Serial No. 629,344

4 Claims. (Cl. 18—56)

Thermo-plastic tubing is generally used throughout various industries for various purposes. One advantage of such tubing is that it may be reshaped by heat and pressure to different cross section or diameter and fixed at such cross section or diameter, known as "sizing." Subsequently by the application of heat the elastic memory of the tubing may cause the tubing to tend to assume its original shape. This property of the elastic tubing is invaluable when using such tubing as an insulation or a wrapping means. By utilizing this function of the plastic, the product to be insulated may be confined within the expanded plastic after which the plastic is deformed by heat, whereby the plastic will assume the shape of the product within it to provide a snug coating.

One example of such use is in the field of electrical connectors. It is common practice to provide a deformable ferrule which is cold forged or crimped onto a conductor for the purposes of joining two parts of an electrical circuit. It is highly desirable that this conductive joint be dielectrically insulated against corrosion by an insulating material forming a waterproof seal. Such an insulation may be easily and efficiently achieved, by placing sized plastic tubing around the ferrule and subsequently applying heat, thus shrinking the tubing onto the ferrule.

It is an object of this invention to provide a method for increasing or altering the size of the plastic tubing within limits (known in the art as "sizing"), so that the elastic memory may later be employed to resize or shrink the tubing. It is also an object of this invention to provide such a means for increasing the diameter of tubing whereby the tubing may be manufactured or resized on a continuous strip.

It is further an object of this invention to provide a continuous strip process for increasing the size of plastic tubing, whereby the increased diameter of the tubing automatically functions as a valving means to control the sizing of the tubing.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration in order that others skilled in the art may fully understand the invention and the principles thereof and the manner of applying it in practical use so that they may modify it in various forms, each as may be best suited to the conditions of a particular use.

In the drawings:

Figure 1 illustrates schematically a system embodying principles set forth in this invention.

Figure 2 illustrates an insulated electrical connector embodying principles of this invention.

As shown in Figure 1, a reel of thermo-plastic tubing 10 is so assembled that it may be unwound and fed through a processing chamber designated 12, after which it is rewound on a spool 14. The sizing operation is performed in chamber 12. Any type of thermo-plastic having a soft melting point and an elastic memory may be employed.

The reel 10 is connected to a source of fluid pressure designated 20. The other end of the tubing is sealed as at 22 or otherwise so constructed as to maintain pressure within the tubing. Standard feed rollers 24 are provided to convey the tubing through the chamber.

The chamber 12 has a closure member 26 at the entrance end 30. An aperture 28 permits the tubing to enter the chamber which is open at the exit end 32. The entrance end of the chamber is provided with a source of heat 36, which is sufficient to bring the temperature of the plastic tubing to its softening point. This heat is controlled so as to maintain the tubing in a pliable state rather than actually melt the tubing.

Also connected to the entrance end of the chamber 12 is a second source of fluid pressure 40, which is greater than the pressure applied at 20. This pressure 40 provides a pressure differential between the outer surface of the plastic and the inner surface of the tubing. Suitable valves and gauges are connected into the system.

The exit end of the chamber 12 is provided with a cooling means 46 which operates to cool the sized plastic tubing down to a temperature wherein it again enters the solid state. Thus after the plastic tubing is sized, it is rigidified at the increased diameter. This permits dormant retention of the elastic memory so that subsequent application of heat may cause it to tend to shrink back to its original size.

The actual sizing of the tubing is accomplished by maintaining a differential pressure between the inside of the tubing and the outside of the tubing. When the pressure within the pliable tubing is greater than the pressure on the outside of the tubing, the pressure differential causes the tubing to swell, i.e. blown up similar to the operation of blowing up a bicycle tire. After the tubing is blown up to the desired diameter in the softened stage, it is then transferred to the cooling stage, so that by solidification of the tubing it is maintained in the expanded condition. This provides an increased diameter tubing which if it is of a kind having the proper elastic memory, may be shrunk back to its original size by the application of heat.

It is necessary to control accurately the pressure differential, since this critical pressure differential determines the final size of the tubing. The present invention contemplates the increased sized tubing acting as a regulator valve to control the pressure differential. Maintaining the tubing at its initial size throughout the chamber would permit escape of the pressure introduced at 40 through opening 32 to decrease the pressure on the outside surface of the tubing. This causes a large pressure differential between the outside of the tubing and the inside of the tubing. Since the inside of the tubing is under a higher pressure than the outside, the tubing swells outwardly until the area between the tubing and the chamber is reduced. When this area is reduced the outside pressure rises until it approximates the pressure inside the tubing. When the pressure on the outside of the tubing and the pressure on the inside of the tubing are substantially equal, the strip of tubing will be maintained at that constant diameter. Thus it is merely necessary to adjust the pressure initially until the tubing is blown up to its desired size. Then the pressure on the inside of the tubing will maintain the tubing at that size constantly. If the inner pressure inadvertently decreases, the smaller diameter tubing will effect a greater pressure drop at 32 because of the greater difference between the inside diameter of the chamber and the outside diameter of the tubing. This will cause a decrease in the pressure operating on the outer surface of the tubing so that the increased relative inner pressure causes the tubing to expand. This expansion continues until the outer pressure is increased to a degree where it is again equal to the pressure within the tubing. It is obvious that any disturbance in either line pressure will be automatically compensated by the degree of expansion of the tubing. Of course, there is a certain amount of elasticity in the tubing which must be taken into consideration. Thus the pressure on the inside will be slightly higher than the pressure on the outside, but this increased pressure is taken up by the elasticity of the tubing, so that in the final analysis the effective pressures are substantially equal.

In the instant invention, it is noted that the passage of the plastic tubing through the chamber is prevented from contacting the sides of the chamber by the pressure medium. This arangement eliminates friction drag during the softening or the hardening stage of the operation since the pressure medium (air or water) acts as a bearing surface.

Applicant has provided a continuous process means for increasing and fixing the size of plastic tubing, without any detriment to the elastic memory properties of the tubing. This tubing may be formed in rolls and utilized as such. Subsequently the tubing may be heated so that it tends to shrink to its original size.

As shown in Figure 2, one application of this plastic is for use as an insulator on an electrical connection. The particular connector shown has a ferrule portion 50 which is deformable onto a conductor in order to form an electrically conductive joint. A plastic sheath or tube 52 surrounds the ferrule and functions as an insulating means. In practice the plastic tube 52 has a diameter greater than the extruded diameter of the original tubing, as set forth in the method described above. This oversized tube 52 encompasses the ferrule 50 with an interference fit, i.e. the inside diameter of the tube is approximately equal to the outside diameter of the ferrule. Thus when the connector is used under high temperature operating conditions, instead of becoming soft and tending to slip off the connection, the insulation will tend to shrink onto the ferrule, (due to the elastic memory of the plastic) to grasp the connection more securely. Alternatively, after the connection is made, heat may be applied to shrink the insulating tubing onto the connection.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

I claim:
1. The method of sizing ductile tubing which includes the steps of (1) continuously moving strip tubing through a pressure chamber (2) applying a controlled pressure centrally of the tubing (3) applying a different pressure to the outside of the tubing as the tubing moves through the chamber (4) heating the tubing as it enters the chamber to permit reformation to the desired diameter (5) subsequently cooling the tubing so that it becomes fixed at the desired diameter and (6) maintaining a constant diameter of the sized tubing during the heating step by venting the pressure on the outside of tubing to the atmosphere through an orifice formed by the outside of the tubing and the inside of the chamber.

2. The method of increasing the diameter of thermoplastic tubing so as to permit it to retain its elastic memory which includes the steps of (1) passing the tubing in a continuous strip through a chamber so that it enters one end of the chamber and exits at the other end (2) heating the tubing at the entrance end to its softening point (3) cooling the tubing at the exit end below its softening point (4) applying differential pressure between the inside and the outside of the tubing and (5) constantly maintaining said pressure differential by venting the pressure on the outside of the tubing through the orifice between the tubing and the chamber.

3. The process of sizing plastic tubing having an elastic memory which includes (1) introducing a fluid pressure centrally of the tubing (2) moving the tubing through a chamber closed at one end and open at the other end so that it feeds into the closed end and emerges from the open end (3) applying heat near the closed end to raise the tubing to its softening point (4) applying fluid pressure externally of the tubing so that the pressure differential causes the tubing to expand to a predetermined size (5) cooling the expanded tubing to a temperature below its softening point, and (6) venting the fluid pressure applied externally of the tubing through the orifice between the expanded tubing and the chamber whereby the expansion of the tubing functions as a pressure compensating means.

4. The method of sizing thermo-plastic tubing of the type which becomes soft in a temperature zone slightly below its melting point, which includes the steps of feeding it into the closed end of a chamber, raising the temperature to the softening zone, applying a pressure differential between the inside and the outside of the tubing to expand the tubing, moving the tubing into a cooling zone of the chamber to return it to its original rigidity while introducing fresh tubing into the heating zone, and removing it from an open end of the chamber while simultaneously moving the tubing from the heating zone to the cooling zone introducing fresh tubing into the heating zone to continue the cycle and venting the pressure on the outside of the tubing through the orifice between the cooled tubing and the chamber.

References Cited in the file of this patent
UNITED STATES PATENTS

| | | |
|---|---|---|
| 1,892,126 | Bailey | Dec. 27, 1932 |
| 2,135,763 | Nicholson | Nov. 8, 1938 |
| 2,401,798 | Reichel | June 11, 1946 |
| 2,446,281 | Harding | Aug. 3, 1948 |
| 2,494,273 | Wigal | Jan. 10, 1950 |
| 2,716,777 | Hagen | Sept. 6, 1955 |